United States Patent
Kim et al.

(10) Patent No.: US 9,125,026 B2
(45) Date of Patent: Sep. 1, 2015

(54) METHOD FOR RECEIVING MULTICAST DATA IN WIRELESS COMMUNICATION SYSTEM AND M2M DEVICE THEREFOR

(75) Inventors: Jeongki Kim, Anyang-si (KR); Kiseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 13/983,267

(22) PCT Filed: Feb. 6, 2012

(86) PCT No.: PCT/KR2012/000842
§ 371 (c)(1),
(2), (4) Date: Aug. 1, 2013

(87) PCT Pub. No.: WO2012/108647
PCT Pub. Date: Aug. 16, 2012

(65) Prior Publication Data
US 2013/0315129 A1    Nov. 28, 2013

Related U.S. Application Data

(60) Provisional application No. 61/440,348, filed on Feb. 7, 2011, provisional application No. 61/446,017, filed on Feb. 23, 2011, provisional application No. 61/475,235, filed on Apr. 14, 2011.

(51) Int. Cl.
*H04W 4/06* (2009.01)
*H04W 52/02* (2009.01)
(Continued)

(52) U.S. Cl.
CPC ............ *H04W 4/06* (2013.01); *H04W 4/005* (2013.01); *H04W 52/0216* (2013.01); *H04W 52/0219* (2013.01); *H04W 68/00* (2013.01); *H04W 76/06* (2013.01); *H04W 92/18* (2013.01)

(58) Field of Classification Search
CPC ... H04W 52/0216; H04W 68/00; H04W 4/06; H04W 76/06; H04W 52/0219; H04W 4/005; H04W 92/18
USPC ......................................................... 370/312
See application file for complete search history.

(56) References Cited

U.S. PATENT DOCUMENTS 8,675,489 B2 * 3/2014 Ronneke et al. ............. 370/235
2006/0240799 A1 10/2006 Kim et al.
(Continued)

FOREIGN PATENT DOCUMENTS

| CN | 101147337 A | 3/2008 |
| CN | 103155664 A | 6/2013 |

OTHER PUBLICATIONS

Fang et al., "Management for M2M Devices," IEEE 802.16p-10/0039, Jan. 7, 2011, 9 pages.
(Continued)

*Primary Examiner* — Brian D Nguyen
(74) *Attorney, Agent, or Firm* — Birch, Stewart, Kolasch & Birch, LLP

(57) ABSTRACT

Disclosed are a method for receiving multicast data in a wireless communication system and a machine to machine (M2M) device therefor. The method wherein the M2M device receives multicast data in a wireless communication system according to the present invention includes the steps of: receiving multicast data from a base station; and indicating that the multicast data transmitted from the base station is the last multicast or receiving information including a signal which indicates the end of multicast transmission. The information can be transmitted with or separate from the multicast data, and is piggybacked with the multicast data if the information is transmitted with the multicast data.

14 Claims, 10 Drawing Sheets

(51) Int. Cl.
  *H04W 4/00*   (2009.01)
  *H04W 68/00*  (2009.01)
  *H04W 76/06*  (2009.01)
  *H04W 92/18*  (2009.01)

(56) References Cited

U.S. PATENT DOCUMENTS

| | | | |
|---|---|---|---|
| 2008/0045262 A1* | 2/2008 | Phan et al. | 455/525 |
| 2008/0232293 A1* | 9/2008 | Mooney et al. | 370/312 |
| 2008/0233974 A1* | 9/2008 | Xu | 455/458 |
| 2011/0134841 A1* | 6/2011 | Shaheen | 370/328 |
| 2011/0201365 A1* | 8/2011 | Segura | 455/466 |
| 2012/0011527 A1* | 1/2012 | Fan et al. | 725/9 |
| 2012/0093052 A1  | 4/2012 | Kang et al. | |

OTHER PUBLICATIONS

Kim et al., "DL/UL Data Transmission for M2M Devices," IEEE C802.16p-10/0020, Dec. 30, 2010, 7 pages.

Lee et al., "Operational States for M2M Device," IEEE C802.16p-10_0027, Dec. 31, 2010, 7 pages.

Yuk et al., "Proposed Modification to Support Macro-Diversity Mode for Multicast Transmission in IEEE 802.16m (16.3.6)," IEEE C802.16m-10-1346, Oct. 25, 2010, 4 pages.

* cited by examiner

METHOD FOR RECEIVING MULTICAST DATA IN WIRELESS COMMUNICATION SYSTEM AND M2M DEVICE THEREFOR

CROSS-REFERENCE TO RELATED APPLICATIONS

This application is the National Phase of PCT/KR2012/000842 filed on Feb. 6, 2012, which claims priority under 35 U.S.C. 119(e) to U.S. Provisional Application No. 61/440,348 filed on Feb. 7, 2011, to U.S. Provisional Application No. 61/446,017 filed on Feb. 23, 2011, and to U.S. Provisional Application No 61/475,235 filed on Apr. 14, 2011, all of which are incorporated by reference herein in its entirety.

TECHNICAL FIELD

The present invention relates to a wireless communication system, and more particularly, to a method of receiving multicast data and M2M device therefor.

BACKGROUND ART

Generally, a machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication performed without human involvement.

In the early 1990's, in which the concept of the M2M communication has been initially introduced, the M2M communication has been recognized as remote control or telematics or the like and derivative markets of the M2M communication were very limitative. Yet, the M2M communication has grown rapidly for past few years and has become the globally noteworthy markets. Specifically, in POS (point of sales) and security related application markets, the M2M communication has considerably influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM (subscriber identity module) card enables data transmission and reception and is capable of remote management and control. For instance, as M2M communication technology is usable for numerous devices and equipment including vehicles, trucks, containers, auto-vending machines, gas tanks and the like, its application fields may reach far and wide.

According to a related art, since mobile stations are managed by individual unit in general, a communication between a base station and a mobile station is usually performed by a one-to-one communication scheme. Assuming that numerous M2M devices communicate with a base station by the one-to-one communication scheme, network may be overloaded due to the occurrence of signaling between the base station and each of the numerous M2M devices. As mentioned in the above description, in case that the M2M communications are rapidly spreading across a wider scope, overheads due to the communications between the M2M devices or the communications between the base station and the M2M devices may cause problems.

Meanwhile, a base station needs to transmit multicast data to M2M devices. However, a method for a base station to transmit multicast data in consideration of properties of M2M devices and a method for efficiently receiving the multicasts have not been proposed in detail yet.

DISCLOSURE OF THE INVENTION

Technical Tasks

One technical task of the present invention is to provide a method for an M2M device to receive multicast data in a wireless communication system.

Another technical task of the present invention is to provide an M2M device configured to receive multicast data in a wireless communication system.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving multicast data, which is received by an M2M (machine to machine) device in a wireless communication system, according to one embodiment of the present invention may include the steps of receiving the multicast data from a base station and receiving information including either a signal indicating that the multicast data corresponds to a last multicast transmission or a signal indicating a multicast transmission end from the base station. Preferably, the information may be transmitted together with or separately from the multicast data. More preferably, if the information is transmitted together with the multicast data, the information may be transmitted in a manner of piggy-backing on the multicast data. In this case, the information may be transmitted in a subheader format or a multicast transmission end extender header format. More preferably, if the information is transmitted separately from the multicast data, the information may be transmitted through one of a MAC control message, a signaling header and a physical layer signaling. In this case, the MAC control message may include AAI-MTE-IND message format or MOB_MTE-IND message format. And, the signaling header may include a multicast transmission end indication header. Moreover, the physical layer signaling may include a multicast transmission end indication A-MAP IE or a broadcast assignment A-MAP IE.

Preferably, the may further include the step of entering an unavailable interval or an idle mode based on the information.

Preferably, the method may further include the step of receiving an M2M group identifier (ID) and an indicator indicating the multicast data transmission, wherein if the M2M group ID corresponds to the M2M device, the multicast data and the information may be received based on the M2M group ID.

More preferably, the method may further include the step of receiving information on a transmission start of the multicast data from the base station, wherein the multicast data may be received based on the information on the transmission start of the multicast data.

To further achieve these and other advantages and in accordance with the purpose of the present invention, an M2M (machine to machine) device, which receives multicast data in a wireless communication system, according to another embodiment of the present invention may include a receiver configured to receive the multicast data from a base station, the receiver configured to receive information including either a signal indicating that the multicast data corresponds to a last multicast transmission or a signal indicating a multicast transmission end from the base station. Preferably, the information may be transmitted together with or separately from the multicast data. More preferably, if the information is transmitted together with the multicast data, the information may be transmitted in a manner of piggybacking on the multicast data. In this case, the information may be transmitted in a subheader format or a multicast transmission end extender header format. More preferably, if the information is transmitted separately from the multicast data, the information may be transmitted through one of a MAC control message, a signaling header and a physical layer signaling.

Preferably, the M2M device may further include a processor controlling either an unavailable interval or an idle mode to be entered based on the information.

Advantageous Effects

According to various embodiments of the present invention, when M2M devices transmit multicast traffics, unnecessary signaling overhead between the M2M device and a base station can be removed, power consumption of the M2M devices can be minimized, and resources can be prevented from being unnecessarily wasted.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
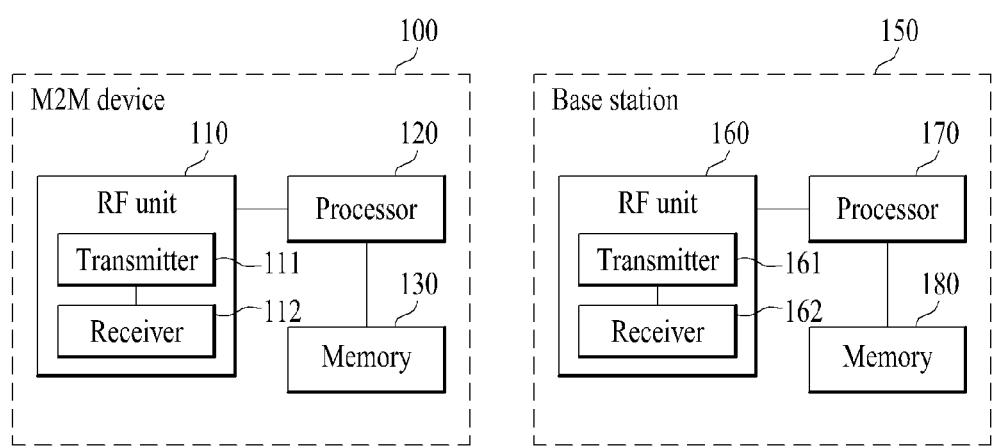
FIG. 1 is a schematic diagram for configurations of an M2M device and a base station according to one embodiment of the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention. For instance, although the following descriptions are made in detail on the assumption that a mobile communication system includes IEEE (institute of electrical and electronics engineers) 802.16 system or 3GPP ($3^{rd}$ generation partnership project) system, they are applicable to other random mobile communication systems except unique features of IEEE 802.16 system or 3GPP system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), a machine-to-machine (M2M) device and the like. And, assume that a base station is a common name of such a random node of a network stage communicating with a terminal as a Node B, an eNode B, a base station (BS), an access point (AP) and the like.

In a mobile communication system, a mobile station (or user equipment) can receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

In the following description, an M2M communication may mean an information exchange performed between mobile stations or between a base station and each of mobile stations without human involvement. Hence, the M2M device may mean a mobile station capable of supporting the above-mentioned M2M device communication. An access service network for an M2M service may be defined as an M2M ASN (M2M access service network) and a network entity performing communications with M2M devices may be named an M2M server. In particular, the M2M server activates an M2M application and provides an M2M-specific service for at least one or more M2M devices. An M2M feature indicates a feature of an M2M application. And, at least one feature may be necessary to provide an application. An M2M device group may mean a group of M2M devices that share at least one common feature with each other.

The devices performing communications by M2M scheme may be variously named M2M devices, M2M communication devices, MTC (machine type communication) devices and the like. And, the number of the devices will increase gradually as the number of machine application types does. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types.

According to properties of M2M devices, the M2M device may have low mobility or no mobility. If a prescribed M2M device has considerably low mobility or does not have mobility at all, it may mean that the corresponding M2M device is stationary in the long term. An M2M communication system may be able to simplify or optimize mobility related operations for a specific M2M application related to such an M2M device having a stationary location as an M2M device for secured access and surveillance, an M2M device for public safety, an M2M device for payment, an M2M device for remote maintenance and control, an M2M device for metering and the like.

Thus, as the device application types increasingly diversified, the number of M2M communication devices may increase more greatly than that of general mobile communication devices. Hence, in case that all of the devices individually perform communications with a base station, it may put serious loads on a radio interface and a network.

In the following description, an embodiment of the present invention is explained with reference to a case of applying M2M communication to a wireless communication system (e.g., IEEE 802.16e/m), by which the present invention may be non-limited. And, an embodiment of the present invention is applicable to such a different wireless communication system as 3GPP LTE system and the like in the same manner.

FIG. 1 is a schematic diagram for configurations of an M2M device and a base station according to one embodiment of the present invention.

Referring to FIG. 1, an M2M device 100, which may be named an M2M communication device but will be named as an M2M device in the following, may include an RF unit 110, a processor 120 and a memory 130. In this case, the memory 130 is an optional component. And, a base station 150 may include an RF unit 160, a processor 170 and a memory 180. In this case, the memory 180 is an optional component. The RF unit 110/160 may include a transmitter 111/161 and a receiver 112/162. For example of the M2M device 100, the transmitter 111 is configured to transmit signals to the base station 150 and other M2M devices. And, the receiver 112 is configured to receive signals from the base station 150 and other M2M devices. The process 120 performs various processings of a signal to transmit and then transfers the processed signal to the transmitter 111. And, the processor 120 may process a signal received by the receiver 112. If necessary, the processor 120 may control information contained in an exchanged message to be saved in the memory 130. The above-configured M2M device 100 may perform various methods according to embodiments of the present invention mentioned in the following description. Besides, the M2M device 100 may further include various kinds of additional components (not shown in FIG. 1) according to its machine application type. In case that the corresponding M2M device 100 is provided for the smart meter, it may further include an additional configuration for power measurement and the like. This power measuring operation may be under the control of the processor 120 shown in FIG. 1 or a separately configured processor (not shown in the drawing).

Although FIG. 1 shows a case that a communication is performed between the M2M device 100 and the base station 150 for example, an M2M communication method according to the present invention may be performed between M2M devices. In particular, each of the M2M devices may have the same device configurations shown in FIG. 1 to perform various methods according to embodiments of the present invention mentioned in the following description.

The transmitter 161 of the base station 150 is configured to transmit signals to another base station, an M2M server and M2M devices. And, the receiver 162 of the base station 150 is configured to receive signals from another base station, an M2M server and M2M devices. The process 170 is functionally connected to each of the transmitter 161 and the receiver 162 to control a process for the transmitter 161 and the receiver 162 to transceive signals with other devices. The processor 170 performs various kinds of processings on a signal to transmit and then transfers the processed signal to the transmitter 161. And, the processor 170 may be able to perform processing on a signal received by the receiver 162. If necessary, the processor 170 may control information contained in an exchanged message to be saved in the memory 180. The above-configured base station 150 may perform various methods according to embodiments of the present invention mentioned in the following description.

The processor 120 of the M2M device 100 directs operations (e.g., control, adjustment, management, etc.) in the M2M device 100. The processor 170 of the base station directs operations (e.g., control, adjustment, management, etc.) in the base station 150. The processor 120/170 may be connected to the memory 130/180 configured to store program codes and data. The memory 130/180 is connected to the processor 120/170 to store operating systems, applications and general files.

The processor 120/170 may be named one of a controller, a microcontroller, a microprocessor, a microcomputer and the like. Moreover, the processor 120/170 may be implemented by hardware, firmware, software or a combination thereof. In case of implementing an embodiment of the present invention using hardware, the processor 120/170 may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing embodiments of the present invention using firmware or software, the firmware or software may be configured to include modules, procedures, and/or functions for performing the functions or operations of the present invention. And, the firmware or software configured to perform the present invention may be driven by the processor 120/170 in a manner of being installed at the processor 120/170 or being saved in the memory 130/180.

In the following description, an idle mode is the mode for operating a paging group, a paging cycle and a paging offset, which are granted by a base station, through signaling between a mobile station and a base station in order to save a power of the mobile station (e.g., M2M device, etc.). In particular, although a mobile station roams a radio link environment in which a plurality of base station exists across a wide area, the idle mode is the mechanism for receiving a downlink broadcast message periodically without registering at a specific base station.

In the idle mode, all normal operations are stopped as well as a handover (HO) and downlink synchronization is coordinated to receive a paging message, which is a kind of a broadcast message, in a predetermined interval only. In this case, the paging message is the message that gives an instruction of a paging action to a mobile station. For instance, the paging operation may include one of a ranging operation, a network reentry and the like.

The idle mode can be initiated by a mobile station or a base station. In particular, the mobile station sends a deregistration request (DREGOREQ) message to a base station and then receives a deregistration response (DREG-RSP) message from the base station in response to the deregistration request message, thereby entering the idle mode. Moreover, if the base station sends a non-requested deregistration response (DREG-RSP) message or a deregistration command (DREG-CMD) message to the mobile station, the mobile station can enter the idle mode.

In case that a mobile station receives a paging message corresponding to itself for an available interval (AI), the mobile station switches to a connected mode through a network entry process with a base station and then transceives data.

An idle state operation or an idle mode operation generally means an operation of supporting a mobile station to periodically perform a downlink broadcast traffic transmission without registering at a specific base station in case of moving away into a radio link environment configured with multiple base stations. In case of failing to receive traffic for predetermined duration, the mobile station can make a transition to an idle state to save a power. Having made the transition to the idle mode, the mobile station receives a broadcast message (e.g., a paging message) broadcasted by the base station for the available interval (AI) and is then able to determine whether to make a transition to a normal mode or stay in the idle state.

An idle state can give a benefit to a mobile station by removing an activation request related to a handover and general operation requests. The idle state puts restriction in a manner that mobile station activity is scanned in a discrete period, whereby a power and operating resources used by the mobile station can be saved. The idle state provides a simple and appropriate scheme for informing a mobile station of a downlink traffic in pending and removes a radio interface and a network handover (HO) traffic from an inactive mobile station, thereby giving benefits to a network and a base station.

Paging means a function of obtaining a location (e.g., a prescribed base station, a prescribed switching station, etc.) of a corresponding mobile station in case of an occurrence of an incoming signal in a mobile communication. A multitude of base station supportive of an idle state or an idle mode can configure a paging region by belonging to a specific paging group. In this case, a paging group indicates a logical group. The object of the paging group is to provide an adjacent range region that can be paged in downlink. Preferably, the paging group is configured to meet a condition that the paging group is large enough for a specific mobile station to exist for most of time within the same paging group and a condition that the paging group is small enough for a paging load to maintain an appropriate level.

A paging group can include at least one base station. And, one base station can be included in one or more paging groups. The paging group is defined by a management system. A paging group-action backbone network message is usable in a paging group. Moreover, a paging controller can manage a list of mobile stations in an idle state using a paging-announce message corresponding to one of backbone network messages and is also able to manage an initial paging of every base station belonging to a paging group.

For clarity of the following description, the paging in idle mode is explained with reference to IEEE 802.16 systems, by which the technical idea of the present invention may be non-limited. A mobile station sends a deregistration request (DREG-REQ) message for requesting a deregistration with a base station to the base station in order to enter an idle mode. Subsequently, the base station sends a deregistration response (DREG-RSP) message to the mobile station in response to the DREG-REQ message. In this case, the DREG-RSP message contains a paging information. In doing so, the entry of the mobile station into the idle mode may be initiated by a request made by the base station. In this case, the base station sends a DREG-RSP message to the mobile station.

The paging information may include a paging cycle, a paging offset, a paging group identifier (PGID), a paging listening interval value and the like.

Having received the DREG-RSP message from the base station, the mobile station enters the idle mode with reference to the paging information. The idle mode has a paging cycle and one paging cycle can be configured with an available interval and an unavailable interval. In this case, the available interval has the same concept of a paging listening interval or a paging interval. A paging offset indicates a start point (e.g., a frame, a subframe, etc.) from which a paging interval starts within a paging cycle. A paging group identifier indicates an identifier of a paging group assigned to a mobile station. Moreover, the paging information may include a paging message offset information. In this case, the paging message offset information indicates a timing point at which a paging message is sent from a base station. Subsequently, the mobile station can receive a paging message delivered to itself in the available interval, i.e., the paging listening interval, using the paging information. In this case, the paging message may be sent via the base station or a paging controller. In particular, in order to receive a paging message, the mobile station monitors a radio channel in accordance with the paging cycle.

The mobile station in the idle mode receives a paging message in a paging listening interval of its own and then checks whether there is a downlink (DL) data delivered to itself. If there is the DL data (i.e., positive indication), the mobile station performs a network reentry process including a ranging process. Subsequently, through a DSA (dynamic service addition) process, the mobile station performs a process for establishing a connection to a related DL service flow. After the connection to the service flow has been established, the base station transmits DL data for the corresponding service to the mobile station.

For clarity, the following description is made with reference to IEEE 802.16e/16 m/16p system, by which the technical idea of the present invention may be non-limited.

A mobile station sends a deregistration request (DREG-REQ) message for requesting a deregistration with a base station to the base station in order to enter an idle mode. Subsequently, the base station sends a deregistration response (DREG-RSP) message to the mobile station in response to the DREG-REQ message. In this case, the DREG-RSP message contains a paging information. In doing so, the entry of the mobile station into the idle mode may be initiated by a request made by the base station. In this case, the base station sends a DREG-RSP message to the mobile station.

The paging information may include a paging cycle, a paging offset, a paging group identifier (PGID), a paging listening interval value and the like. Having received the DREG-RSP message from the base station, the mobile station enters the idle mode with reference to the paging information.

The idle mode has a paging cycle and one paging cycle can be configured with an available interval and an unavailable interval. In this case, the available interval has the same concept of a paging listening interval or a paging interval. A paging offset indicates a start point (e.g., a frame, a subframe, etc.) from which a paging interval starts within a paging cycle. And, a paging group identifier indicates an identifier of a paging group assigned to a mobile station. Moreover, the paging information may include a paging message offset information. In this case, the paging message offset information indicates a timing point at which a paging message is sent from a base station.

Thereafter, the mobile station can receive a paging message delivered to itself in the available interval (i.e., the paging listening interval) using the paging information. In this case, the paging message may be sent via the base station or a paging controller. In particular, in order to receive a paging message, the mobile station monitors a radio channel in accordance with the paging cycle.

Figure 2:
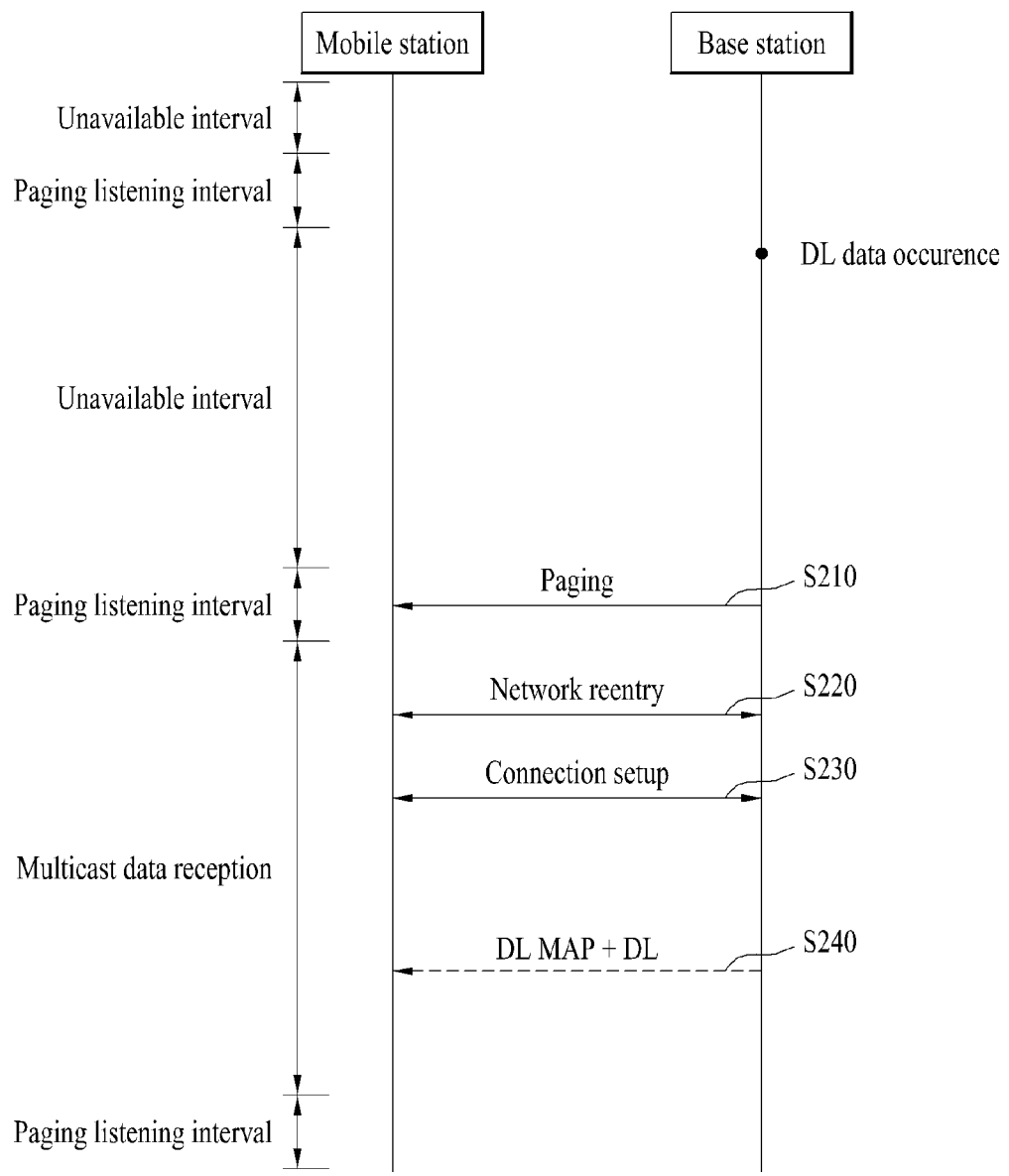
FIG. 2 is a flowchart of a paging procedure in idle mode.

FIG. 2 is a flowchart of a paging procedure in idle mode.

A mobile station in idle mode receives a paging message in its paging listening interval and then checks whether there is a downlink (DL) data delivered to itself [S210]. If there is the DL data (i.e., positive indication), the mobile station performs a network reentry process including a ranging process [S220]. Subsequently, through a DSA (dynamic service addition) process, the mobile station performs a process for establishing a connection to a related DL service flow [S230]. After the connection to the service flow has been established, a base station transmits DL control information and DL data for the corresponding service to the mobile station [S240].

In M2M scenarios, most of M2M devices are handheld mobile stations including mobile phones and the like, an automatic application or firmware update process may become an important application in M2M service scenarios. For instance, in order update firmware of each device, M2M server may be able to transmit updated information to every M2M device having the corresponding application installed therein. In order to transmit this multicast data, which is necessary to be transmitted in common to a plurality of mobile stations, to M2M devices in idle mode, the base station of the embodiment shown in FIG. 2 will page the corresponding M2M devices. Subsequently, each of the paged mobile stations accesses a network by performing a network reentry process in a manner of initiating a transmission of random access code and may then receive DL traffic transmitted from the base station. These processes cause a problem of increasing the unnecessary use of resources of a network and a problem of increasing power consumption of the mobile station.

In order to solve the above problems, in an M2M communication according to the present invention, when a multicast data generated by event triggering is transmitted to a mobile station in idle mode, an M2M device in idle mode can efficiently receive multicast data using a paging method.

Figure 3:
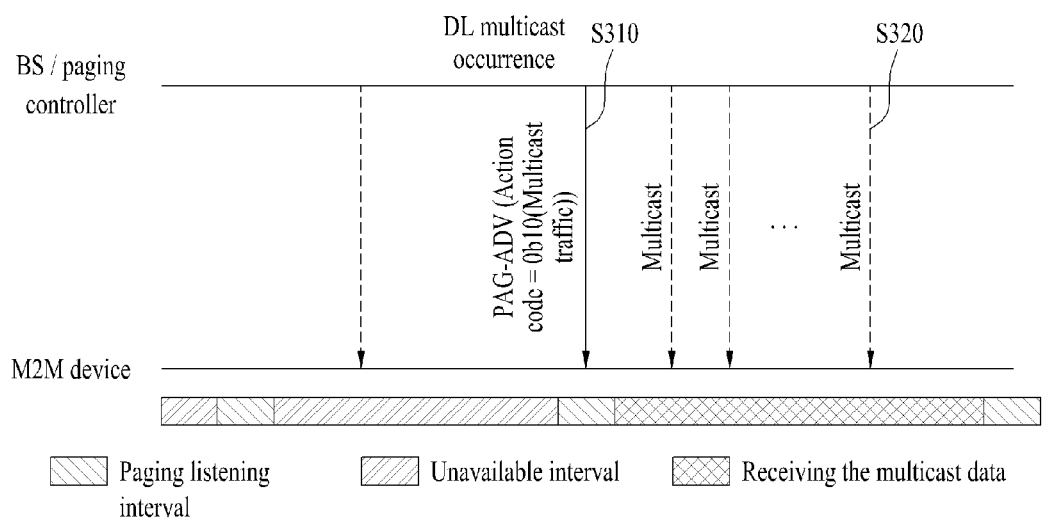
FIG. 3 is a diagram for one example of a multicast data transmission between an M2M device and a base station according to one embodiment of the present invention.

FIG. 3 is a diagram for one example of a multicast data transmission between an M2M device and a base station according to one embodiment of the present invention.

Referring to FIG. 3, before transmitting M2M multicast data to an M2M device, a base station sends a paging message including a multicast traffic indication (i.e., indicating that multicast data is transmitted) in a paging listening interval of M2M devices [S310]. In this case, an action code of the paging message indicates a multicast traffic indication (e.g., 0b10) and a corresponding M2M group identifier (MGID) is included. When the paging message is received, the M2M device checks whether M2M group ID previously assigned to the corresponding M2M device is included in a group paging part of the paging message. If the MGID assigned to the M2M device is included and a corresponding action code is 0b10, the processor 120 of the M2M device determines that a multicast traffic (data) will be transmitted for a group indicated by the MGID and can control the M2M device to wait for receiving the multicast traffic without ending an idle mode. In this case, the processor 120 of the M2M device controls an operation (e.g., DL control channel and multicast data decoding) of receiving the multicast data to be performed in an unavailable interval as well.

If the base station is unable to transmit multicast data right after sending the paging message, the base station can transmit an information on a multicast transmission start time (MTST) for the corresponding M2M group ID (MGID) in a manner that the corresponding information is included in the paging message.

When each of the M2M devices receives the paging message (e.g., AAI-PAG-ADV message) in its paging listening interval, the processor 120 of the corresponding M2M device checks whether the multicast traffic indication (action code=ob10) and the M2M group ID (MGID) assigned to the corresponding M2M device exist. If the multicast traffic indication indicating that the multicast traffic will be transmitted is included, the processor 120 of the M2M device checks whether the multicast transmission start time information is included in the paging message. If the multicast transmission start time information is included in the paging message, the processor 120 of the M2M device can control a power-down operation to be performed to reduce power consumption until a frame indicated by the multicast transmission start time. In particular, the processor 120 of the M2M device controls an operation of receiving the multicast data to be performed from the frame indicated by the MTST. The M2M device receives the multicast data in the frame indicated by the MTST.

Table 1 shows one example of the paging message (e.g., AA_-PAG-ADV message) format.

TABLE 1

| Fields | Size | Value | Condition |
|---|---|---|---|
| . . . | . . . | . . . | . . . |
| For (i=0; i<Num_MGID; i++) { | | Num_MGID indicates the number of MGIDs included in this paging message [0..63] | |
| MGID | 12 | M2M Group ID | |
| Action Code | 2 | 0b00: Performing network reentry 0b01: Performing location update 0b10: Receiving multicast traffic 0b11: reserved | |
| If (Action code == 0b10) { | | | |
| Multicast transmission | 8 | Least Significant 8 bits of the | Shall be present when the MTST |

TABLE 1-continued

| Fields | Size | Value | Condition |
|---|---|---|---|
| start time (MTST) | | frame number in which the ABS starts ending DL multicast data. | needs to be included in this message |
| } | | | |
| ... | | ... ... | |
| } | | | |
| ... | | ... ... | ... |

Referring to Table 1, a paging message includes an action code indicating a network reentry, a location update, a multicast or traffic reception or the like. If the action code set to 1 indicates the multicast traffic reception, the paging message can include a multicast transmission start time (MTST) field corresponding to an information on a multicast transmission start time. In particular, the multicast transmission start time is the information on a time (frame, subframe or superframe unit) at which a base station starts a multicast transmission to an M2M device. For example, the MTST may indicate least significant bits (LSB) of the frame number for starting to transmit 8-bit DL multicast data.

Figure 4:
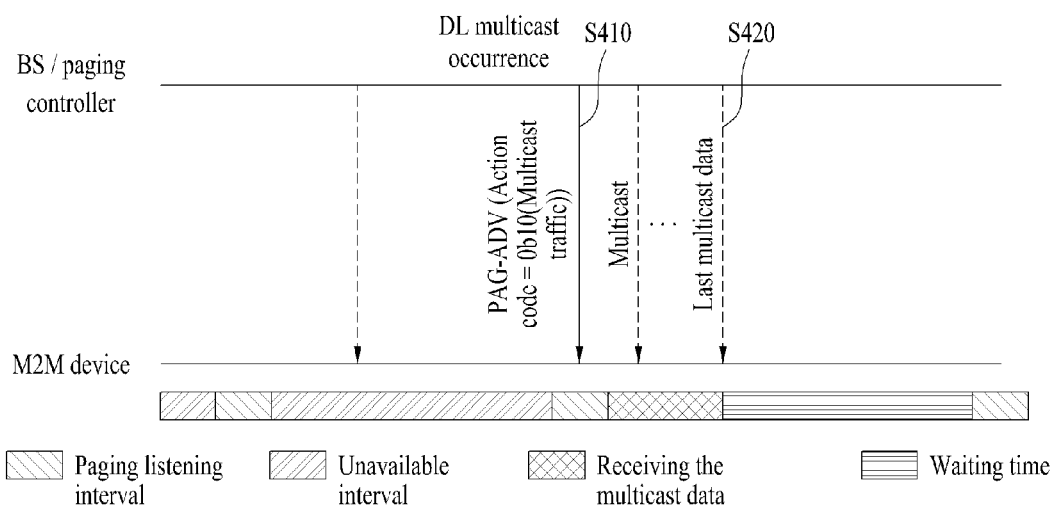
FIG. 4 is a diagram for another example of a multicast data transmission between an M2M device and a base station according to one embodiment of the present invention.

FIG. 4 is a diagram for another example of a multicast data transmission between an M2M device and a base station according to one embodiment of the present invention.

As mentioned in the foregoing description, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S410]. In this case, if the received M2M group ID information indicates a group to which the corresponding M2M device belongs, a processor 120 of the M2M device controls the M2M device to wait for receiving the multicast traffic without reentering a network and the M2M device can receive the multicast traffic [S420].

In this scenario, since the M2M device does not know when the multicast data will stop being transmitted from the base station, the M2M device may need to perform an operation of receiving the multicast data until a next paging listening interval. In case that the multicast data includes such a small-size data as a firmware update, a time taken for the base station to actually transmit the multicast data is not considerable, which just causes a problem of increasing power consumption of the idle-mode M2M device. Particularly, right after paging, when the base station transmits small multicast data, the processor 120 of the M2M device controls the M2M device to wait (or stand by) until a next paging listening interval.

Owing to the M2M application properties, a long paging cycle may apply to a specific M2M device. In this case, an increasing rate of power consumption of the M2M device may further increase. For instance, considering that a paging cycle of the conventional IEEE 802.16m system amounts to maximum 512 super frames, a maximum value of a paging cycle in a system for M2M device (e.g., IEEE 802.16p system) can be defined as 4,194,304 super frames.

In order to solve the above-mentioned problem of the unnecessary power consumption of the idle-mode M2M device, the following description is made with reference to FIG. 5.

Figure 5A:
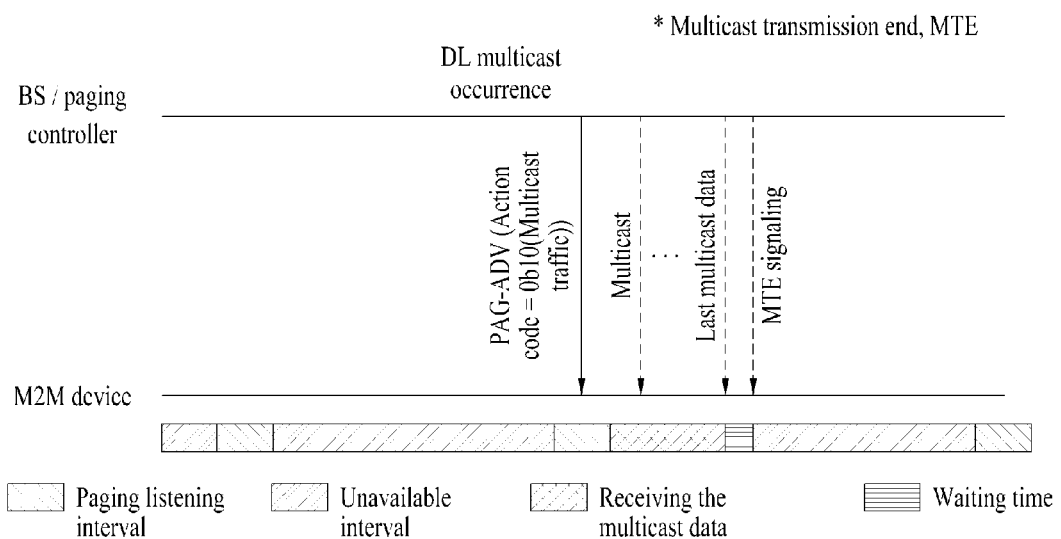
FIG. 5A and FIG. 5B are diagrams for other examples of a multicast data transmission between an M2M device and a base station according to one embodiment of the present invention.
Figure 5B:
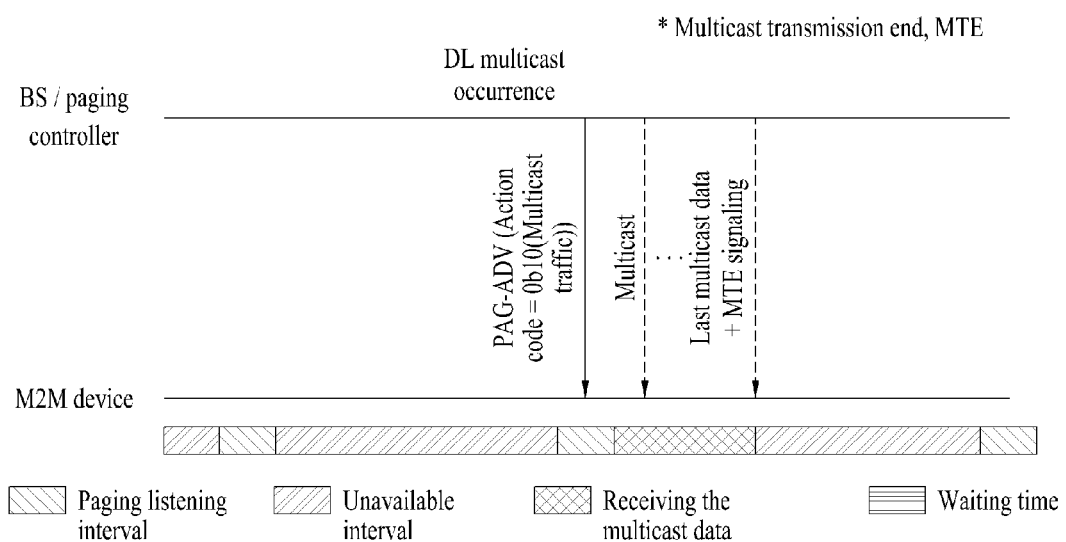

FIG. 5A and FIG. 5B are diagrams for other examples of a multicast data transmission between an M2M device and a base station according to one embodiment of the present invention.

Referring to FIG. 5A and FIG. 5B, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval). In this case, if the received M2M group ID information indicates a group to which the corresponding M2M device belongs, a processor 120 of the M2M device controls the M2M device to wait for receiving the multicast traffic without reentering a network and the M2M device can receive the multicast traffic.

A base station can send a multicast transmission end (MTE) signaling on the following condition.

1) Condition 1: If a last data for a corresponding multicast group/multicast connection exists in a transmitting (Tx) buffer of a base station 2) Condition 2: When a base station receives a signal indicating that a data transmission for a corresponding multicast group/multicast connection has been ended from an entity of a network 3) Condition 3: After a base station has transmitted a data for a specific multicast group to an M2M device, if the base station fails in receiving data belonging to the same group from a network within a specific time (i.e., if a transmitting (Tx) buffer does not have the same multicast data for a specific time)

Referring to FIG. 5A, when a base station determines that multicast data has been fully transmitted, the base station can separately transmit a signal (e.g., MTE (multicast transmission end) signal) indicating an end of the multicast data transmission to an M2M device. While an M2M device in idle mode is receiving multicast data, if the M2M device receives the signal indicating the end of the multicast data transmission from the base station, a processor 120 of the M2M device directly enters a paging unavailable interval and is then able to perform an operation of reducing power consumption.

In case of Condition 1, referring to FIG. 5B, a base station can transmit an MTE signal to an M2M device together with a last data at a timing point of transmitting the last data to its buffer. In case of Condition 2, if a base station receives a signal indicating a data transmission end while receiving multicast data from a network entity, the base station can transmit an MTE signal to an M2M device together when transmitting the corresponding multicast data. Thus, in case that a base station transmits an MTE signal together with a multicast data, the MTE signal can be transmitted by piggybacking on the multicast data or by being concatenated with the multicast data. When the MTE signal is transmitted by piggybacking, it can be transmitted in a sub-header format or an extended header format.

Figure 6:
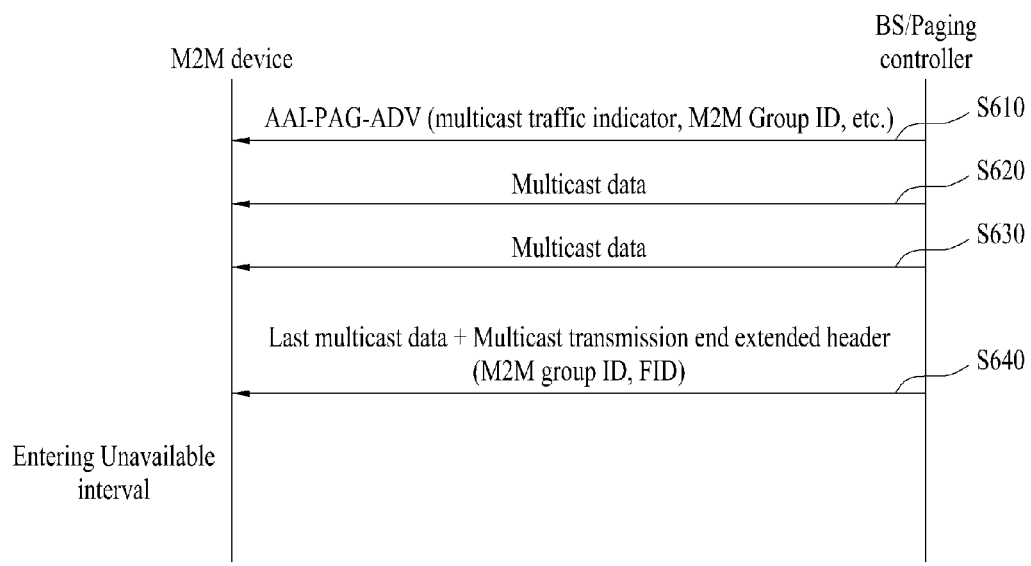
FIG. 6 is a diagram for another example of a multicast data transmission between an M2M device and a base station according to one embodiment of the present invention.

FIG. 6 is a diagram for another example of a multicast data transmission between an M2M device and a base station according to one embodiment of the present invention.

Referring to FIG. 6, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S610]. In this case, if the received M2M group ID information indicates a group to which the corresponding M2M device belongs, a processor 120 of the M2M device controls the M2M device to wait for receiving the multicast traffic without reentering a network and the M2M device can receive the multicast traffic [S620]. Subsequently, the base station can transmit both a last multicast data and a signal (e.g., an MTE (multicast transmission end) signal) indicating an end of a multicast data transmission to the M2M device [S640]. In this case, the MTE signal can be transmitted in a multicast transmission end extended header (MTEEH) format shown in Table 2. Table 2 shows one example of MTEEH format.

TABLE 2

| Syntax | Size (bits) | Description/Notes |
| --- | --- | --- |
| Type | 4 | |
| M2M Group ID | 15 | M2M group ID |
| FID | 4 | Flow ID for multicast connection |
| Idle mode resuming Start Frame | 4 | Least Significant 4 bits of the frame number in which the device resumes the idle mode by using the previous idle mode parameters |

Referring to Table 2, MTEEH format indicates that a multicast transmission has been ended through a type field. In order to indicate a type of a multicast information, the MTEEH format can include at least one of M2M group ID and FID for a related multicast connection. Moreover, the MTEEH format can include an idle mode resuming start frame information indicating when an M2M device can resume an idle mode after receiving MTEEH using previous idle mode parameters. In particular, if a frame indicated by an idle mode resuming start frame field corresponds to a paging unavailable interval of the M2M device when using a previous idle mode parameter, the M2M device can enter the unavailable interval to perform an operation of reducing power consumption in order to reduce the power consumption. If the idle mode resuming start frame information is not included, the M2M device directly enters the unavailable interval. In doing so, the idle mode resuming start frame field can indicate least significant bits (e.g., 4 bits, etc.) of the frame number of the M2M device, which resumes the idle mode, using the previous idle mode parameters.

In IEEE 802.16e system, the MTEEH can be used in form of a subheader (i.e., MTE subheader) or an extended subheader (i.e., MTE extended subheader) and inclusive information may be similar. In this case, CID (connection identifier) may be included instead of FID.

Figure 7:
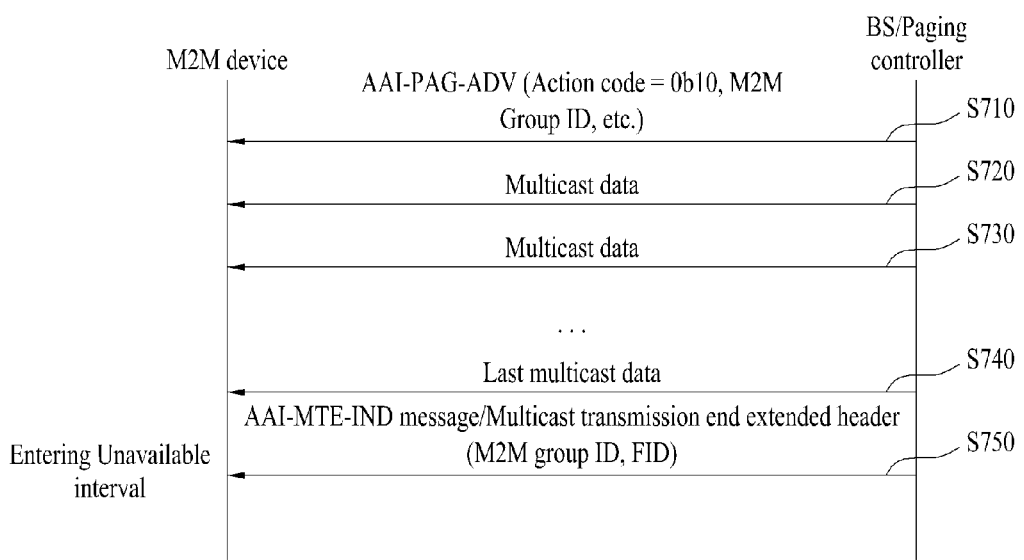
FIG. 7 is a diagram for another example of a multicast data transmission between an M2M device and a base station according to one embodiment of the present invention.

FIG. 7 is a diagram for another example of a multicast data transmission between an M2M device and a base station according to one embodiment of the present invention.

Referring to FIG. 7, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S710]. In this case, if the received M2M group ID information indicates a group to which the corresponding M2M device belongs, a processor 120 of the M2M device controls the M2M device to wait for receiving the multicast traffic without reentering a network and the M2M device can receive the multicast traffic [S720, S730]. Subsequently, the base station transmits a last multicast data to the M2M device [S740] and then informs the M2M device of a multicast data transmission end indication using such a MAC control message as AAI-MTE-IND message or a multicast transmission end indication header [S750]. In this case, the AAI-MTE-IND message or the multicast transmission end indication header can include an M2M group ID and an FID. If the M2M device receives an indicator indicating that the multicast data transmission has been ended, the processor 120 of the M2M device controls the M2M device to enter an unavailable interval.

Thus, when the base station transmits the multicast transmission end (MTE) signal to the M2M device at the same timing point as Condition 3 mentioned in the foregoing description, the base station can transmit the multicast transmission end signal in form of a MAC control message or a signaling header. Table 3 shows one example of a format of AAI-MTE-IND message which is a sort of a MAC control message for delivering an MTE signal.

TABLE 3

| Fields | Size (bits) | Description/Notes |
| --- | --- | --- |
| M2M Group ID | 15 | M2M group ID |
| FID | 4 | Flow ID for multicast connection |
| Idle mode resuming Start Frame | 4 | Least Significant 4 bits of the frame number in which the device resumes the idle mode by using the previous idle mode parameters |

Referring to Table 3, like Table 2, an M2M group ID field, an FID field, an idle mode resuming start frame field and the like can be included in an AAI-MTE-IND MAC control message format. If receiving an AAI-MTE-IND message, an M2M device can enter an idle mode in a frame indicated by the idle mode resuming start frame field.

In IEEE 802.16e system, the AAI-MTE-IND message can be used through a similar MAC control message and similar information can be included therein. In this case, CID (connection identifier) will be included instead of MGID or FID. MAC control message (e.g., MOB_MTE-IND message) of IEEE 802.16e system, which reflects the above description, can be represented as Table 4.

Table 4 shows one example of MOB_MTE-IND message in IEEE 802.16e system.

TABLE 4

| Fields | Size (bits) | Description/Notes |
| --- | --- | --- |
| M2MCID | 16 | M2M connection identifier |
| Idle mode resuming Start Frame | 4 | Least Significant 4 bits of the frame number in which the device resumes the idle mode by using the previous idle mode parameters |

Referring to Table 4, an MOB_MTE-IND message can include an M2M connection identifier (M2MCID) field (instead of MGID or FID) and an idle mode resuming start frame field. Likewise, if receiving AAI-MTE-IND message, an M2M device can enter an idle mode in a frame indicated by the idle mode resuming start frame field.

Meanwhile, when AAI-MTE-IND message or MOB_MTE-IND message is broadcasted, if an end indicator for at least one multicast connection is indicated at a timing point of sending the message, a related MAC control message, a subheader/extended header or a signaling header may include at least one M2M group ID (i.e., M2M group ID (MGID) or M2M connection identifier (M2MCID)).

Table 5 and Table 6 show examples of AAI-MTE-IND message and MOB_MTE-IND message, each of which includes at least one M2M group ID indicating a multicast data transmission end [Table 5: AAI-MTE-IND message, Table 6: MOB_MTE-IND message].

TABLE 5

| Fields | Size (bits) | Description/Notes |
|---|---|---|
| For (i=0; i<NUM_MGID;i++) {<br>M2M Group ID<br>} | 12 | M2M group ID |

TABLE 6

| Fields | Size (bits) | Description/Notes |
|---|---|---|
| For (i=0; i<NUM_MGID;i++) {<br>M2M CID<br>} | 16 | M2M connection identifier |

Table 7 shows one example of a format of a multicast transmission end indication header as a signaling header for delivering MTE signal.

TABLE 7

| Syntax | Size (bits) | Description/Notes |
|---|---|---|
| Multicast Transmission End Indication Header ( )<br>{ | | |
| FID | 4 | |
| Type | 5 | Multicast transmission end indication header |
| Length | 3 | |
| M2M Group ID | 15 | M2M group ID |
| FID | 4 | ID for multicast connection |
| Idle resuming Start Frame | 4 | Least Significant 4 bits of the frame number in which the device resumes the idle mode by using the previous idle mode parameters |

Referring to Table 7, a multicast transmission end indication header format can include an FID field, a type field indicating a multicast transmission end indication header, a length field indicating a length, an M2M group ID field, an FID field indicating an FID corresponding to an ID for a multicast connection, and an idle mode resuming start field.

The AAI-MTE-IND message or the multicast transmission end indication header is applicable to 3GPP LTE/LTE-A system in a similar manner as well as to IEEE 802.16 system.

Figure 8:
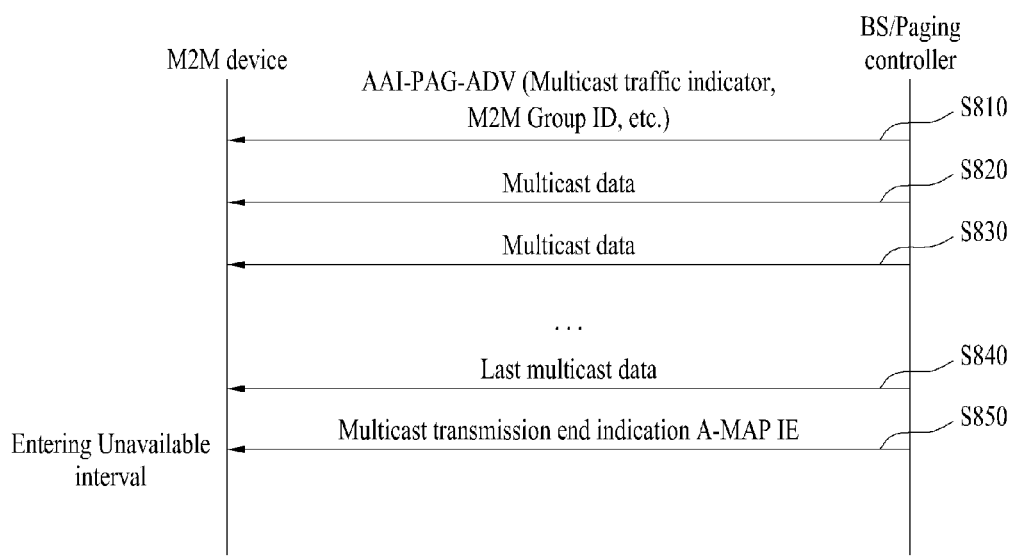
FIG. 8 is a diagram for another example of a multicast data transmission between an M2M device and a base station according to one embodiment of the present invention.

FIG. 8 is a diagram for another example of a multicast data transmission between an M2M device and a base station according to one embodiment of the present invention.

Referring to FIG. 8, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S810]. In this case, if the received M2M group ID information indicates a group to which the corresponding M2M device belongs, a processor 120 of the M2M device controls the M2M device to wait for receiving the multicast traffic without reentering a network and the M2M device can receive the multicast traffic [S820, S830]. Subsequently, the base station transmits a last multicast data to the M2M device [S840] and may then transmit a multicast data transmission end indication signal (MTE signal) by physical layer signaling (PHY signaling) [S850]. The base station may transmit an MTE indicator to the M2M device in A-MAP IE format as a downlink control channel 158501. If the M2M device receives an indicator indicating that the multicast data transmission has been ended, the processor 120 of the M2M device then controls the M2M device to enter an unavailable interval.

Table 8 shows one example of a multicast transmission end indication A-MAP IE format.

TABLE 8

| Syntax | Size (bits) | Description/Notes |
|---|---|---|
| Multicast Transmission End Indication A-MAP IE ( ) {<br>Type | 4 | |
| M2M Group ID | TBD | M2M group ID to which devices belong |
| FID | 4 | ID for multicast connection |
| Idle mode resuming Start Frame | 4 | Least Significant 4 bits of the frame number in which the device resumes the idle mode by using the previous idle mode parameters |

Referring to FIG. 8, a multicast transmission end indication A-MAP IE can include an M2M group ID field indicating an M2M group ID to which an M2M device belongs, an FID field indicating an ID for a multicast connection and an idle mode resuming start frame field. The multicast transmission end indication A-MAP IE may be transmitted in the same burst or frame of a last multicast data or at a timing point previous to that of the last multicast data. A start frame indicates a frame in which an M2M device enters an unavailable interval by stopping a multicast data reception.

Meanwhile, a base station can transmit an MTE indicator to an M2M device by physical layer signaling in a manner that the MTE indicator is included in a DL control channel (e.g., A-MAP IE format). For instance, the base station enables an indicator, which indicates that a corresponding data is a last data, to be included in MAP IE for allocating a DL resource of a last multicast data. If the corresponding data is the last data, the base station can set the corresponding bit to 1 for example. For example of the MAP IE, there may be broadcast assignment A-MAP IE.

A table in the following shows one example of broadcast assignment A-MAP IE for transmitting M2M multicast data and an indicator indicating a last multicast data is included.

Figure 9:
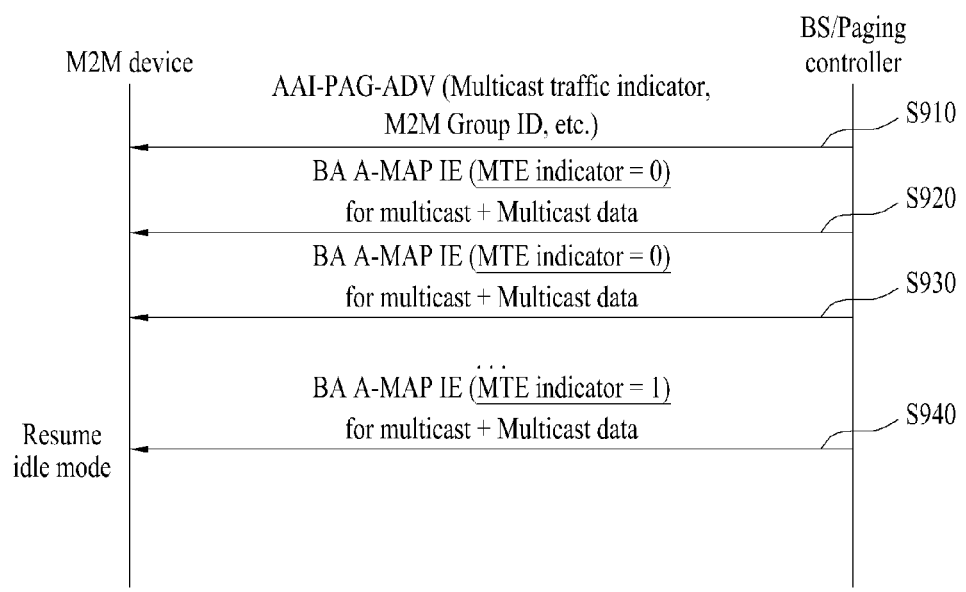
FIG. 9 is a diagram for a further example of a multicast data transmission between an M2M device and a base station according to one embodiment of the present invention.

FIG. 9 is a diagram for a further example of a multicast data transmission between an M2M device and a base station according to one embodiment of the present invention.

Referring to FIG. 9, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S910]. In this case, if the received M2M group ID information indicates a group to which the corresponding M2M device belongs, a processor 120 of the M2M device controls the M2M device to wait for receiving the multicast traffic without reentering a network and the M2M device can receive the multicast traffic and a broadcast assignment A-MAP IE (BA A-MAP IE) [S920]. In this case, an MTE indicator included in the broadcast assignment A-MAP IE is set to 0 to indicate that the multicast data keeps being transmitted. Subsequently, the base station transmits the multicast data and the broadcast assignment A-MAP IE (BA A-MAP IE) to the M2M device [S930]. In doing so, as the MTE indicator included in the broadcast assignment A-MAP IE is set to 0 to indicate that the multicast data keeps being transmitted.

While the multicast data transmissions are repeated, the base station transmits the multicast data and a broadcast assignment A-MAP IE (BA A-MAP IE) including an MTE indicator (in this case, the MTE indicator is set to 1) indicating a last multicast transmission to the M2M device [S940]. Having received the multicast data and the broadcast assignment A-MAP IE (BA A-MAP IE) including the MTE indicator indicating the last multicast transmission, the M2M device enters an idle mode again.

Table 9 shows one example of a broadcast assignment A-MAP IE.

TABLE 9

| Syntax | Size (bit) | Description/Notes |
| --- | --- | --- |
| Broadcast_Assignment_A-MAP_IE( ) { | | |
| A-MAP IE Type | 4 | Broadcast Assignment A-MAP IE |
| Function index | 2 | 0b00: This IE carries broadcast assignment information<br>0b01: This IE carries handover ranging channel allocation information<br>0b10: This IE carries multicast assignment information<br>0b11: This IE carries multicast assignment information for M2M application |
| ... } else if {Function Index == 0b11} { | | |
| Burst Size | 6 | Burst size as indicated in the first 39 entries in Table 958 |
| Resource Index | 11 | 512 EFT size: 0 in first 2 MSB bits + 9 bits for resource index<br>1024 FFT size: 11 bits for resource index<br>2048 FFT size: 11 bits for resource index<br>Resource index includes location and allocation size. |
| Long_TTI_Indicator | 1 | Indicates number of AAI subframes spanned by the allocated resource.<br>0b0: 1 AAI subframe (default TTI)<br>0b1: 4 DL AAI subframe for FDD or all DL AAI subframes for TDD (long TTI) |
| Multicast transmission end indicator | 1 | Indicates whether the data indicated by this A-MAP is the last data. |
| M2M group ID } | 15 | — |

Referring to Table 9, a broadcast assignment A-MAP IE can include an A-MAP IE type field indicating an A-MAP IE type and a function index field indicating a function of the broadcast assignment A-MAP IE. If the function index field indicates a multicast assignment A-MAP IE for an M2M application, an information field (e.g., a burst size field, a resource index field, a long_TTI_Indicator field, etc.) for resource allocation of multicast data, a multicast transmission end indicator (i.e., indicator indicating that a last multicast data is transmitted) field and an M2M group ID field indicating an M2M group ID can be further included.

When the multicast transmission end indicator field of the broadcast assignment A-MAP IE is set to 1 in the last multicast data transmission, if an M2M device receives a broadcast assignment A-MAP IE having the multicast transmission end (MTE) indicator field set to 1, the M2M device receives the last multicast data and then enters an idle mode or an unavailable interval directly. Compared to the former method of transmitting the multicast transmission end indicator in format of a MAC control message or an extended header, this method is advantageous in that other PFDM symbols are not buffered unnecessarily until the M2M device completes the decoding of MPDU (MAC protocol data unit) for the multicast data and the MAC control message or extended header including the multicast transmission end indicator. In particular, in this case, OFDM symbols are buffered up to the subframe including the last multicast data only. Even if the decoding of the multicast data is not completed, it is advantageous in that OFDM symbols need not to be buffered in a next subframe.

In the above description of the various kinds of the message formats, a bit size of the M2M group ID (MGID) is described as 12 bits or 15 bits. Yet, the bit size of MGID can be changed into 15 bits in the message format in which the bit size of the MGID is 12 bits, and vice versa. Moreover, it is necessary for the MGID to identify a group of M2M devices only. Hence, the bit size of the MGID is non-limited by 12 bits or 15 bits.

In the above description so far, various embodiments related to the multicast data transmission between an M2M device and a base station are explained. In particular, although the above description is described as applying to multicast data, it may apply to unicast data, broadcast data and the like. Although the above description is explained as relating to the multicast data transmission between an M2M device and a base station, it may apply to HTC (human type communication) devices (e.g., mobile terminal).

So far, embodiments of the present invention are described using the message formats used by IEEE 802.16m system. Yet, the present invention may be non-limited by the names of the message formats. And, the present invention may apply to message formats of 3GPP LTE/LTE-A system, which perform the same functions of message formats having names different from those of the message formats used by IEEE 802.16m system.

According to various embodiments of the present invention, when M2M devices transmit multicast traffics, unnecessary signaling overhead between the M2M device and a base station can be removed, power consumption of the M2M devices can be minimized, and resources can be prevented from being unnecessarily wasted.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method for an M2M device to receive multicast data from a base station is industrially available for various communication systems including 3GPP LTE, 3GPP LTE-A, IEEE 802.16 and the like.

What is claimed is:

1. A method of receiving multicast data at a machine to machine (M2M) device in a wireless communication system, the method comprising:
   receiving a paging message from a base station during a paging listening interval of the M2M device, the paging message includes a multicast traffic indicator indicating receiving multicast traffic;
   receiving multicast data from the base station;
   receiving a message including a signal indicating that the multicast data corresponds to a last multicast transmission or a signal indicating an end of multicast data transmission from the base station; and
   entering a paging unavailable interval upon receiving the message,
   wherein the paging message further includes a multicast transmission start time indicating a time at which the multicast data is received, and
   wherein the multicast transmission start time is signaled as least significant 8 bits of a frame number in which the base station starts transmitting the multicast data.

2. The method of claim 1, wherein the multicast traffic indicator is set to 0b10.

3. The method of claim 1, wherein the paging message further includes a multicast transmission start time, further comprising operating at a power down state until a frame indicated by the multicast transmission start time.

4. The method of claim 1, wherein the message further includes a M2M group identifier (ID) (MGID) corresponding to the M2M device.

5. The method of claim 1, wherein the message further includes a M2M connection identifier (M2MCID) corresponding to the M2M device.

6. The method of claim 1, wherein the message is a AAI-MTE-IND message.

7. The method of claim 1, wherein the message is MOB_MTE-IND message.

8. The method of claim 1, wherein the message is sent by a multicast Assignment A-MAP IE or a broadcast Assignment A-MAP IE.

9. A method of transmitting multicast data at a base station in a wireless communication system, the method comprising:
   transmitting a paging message to a machine to machine (M2M) device during a paging listening interval of the M2M device, the paging message includes a multicast traffic indicator indicating receiving multicast traffic;
   transmitting multicast data to the M2M device; and
   transmitting a message including a signal indicating that the multicast data corresponds to a last multicast transmission or a signal indicating an end of multicast data transmission from the base station,
   wherein the paging message further includes a multicast transmission start time indicating a time at which the multicast data is transmitted, and
   wherein the multicast transmission start time is signaled as least significant 8 bits of a frame number in which the base station starts transmitting the multicast data.

10. The method of claim 9, wherein the paging message further includes a M2M group identifier (ID) (MGID) corresponding to the M2M device.

11. The method of claim 9, wherein the paging message further includes a M2M connection identifier (M2MCID) corresponding to the M2M device.

12. A machine to machine (M2M) device of receiving multicast data in a wireless communication system, the M2M device comprising:
   a Radio Frequency (RF) module; and
   a processor configured to:
      control the RF module,
      receive a paging message from a base station during a paging listening interval of the M2M device, the paging message includes a multicast traffic indicator indicating receiving multicast traffic,
      receive multicast data from the base station,
      receive a message including a signal indicating that the multicast data corresponds to a last multicast transmission or a signal indicating an end of multicast data transmission from the base station, and
      enter a paging unavailable interval upon receiving the message,
   wherein the paging message further includes a multicast transmission start time indicating a time at which the multicast data is received, and
   wherein the multicast transmission start time is signaled as least significant 8 bits of a frame number in which the base station starts transmitting the multicast data.

13. The M2M device of claim 12, wherein the paging message further includes a multicast transmission start time, the processor is further configured to control that operate at a power down state until a frame indicated by the multicast transmission start time.

14. A base station of transmitting multicast data in a wireless communication system, the base station comprising:
   a Radio Frequency (RF) module; and
   a processor configured to:
      control the RF module,
      transmit a paging message to a machine to machine (M2M) device during a paging listening interval of the M2M device, the paging message includes a multicast traffic indicator indicating receiving multicast traffic,
      transmit multicast data to the M2M device, and
      transmit a message including a signal indicating that the multicast data corresponds to a last multicast transmission or a signal indicating an end of multicast data transmission from the base station,
   wherein the paging message further includes a multicast transmission start time indicating a time at which the multicast data is received, and
   wherein the multicast transmission start time is signaled as least significant 8 bits of a frame number in which the base station starts transmitting the multicast data.

* * * * *